United States Patent [19]
Shiga

[11] Patent Number: 5,907,718
[45] Date of Patent: May 25, 1999

[54] SIGNAL PROCESSING SYSTEM FOR TRANSMISSION OF DATA BETWEEN A KEYBOARD AND A SIGNAL PROCESSING UNIT

[75] Inventor: Sadakazu Shiga, Fukushima-ken, Japan

[73] Assignee: Alps Electric Co., Ltd., Tokyo, Japan

[21] Appl. No.: 08/838,107

[22] Filed: Apr. 15, 1997

[30] Foreign Application Priority Data

Apr. 30, 1996 [JP] Japan ................................. 8-109487

[51] Int. Cl.$^6$ .............................. G06F 13/00; G06F 3/00
[52] U.S. Cl. ........................ 395/887; 395/309; 395/882; 395/883; 364/708.1
[58] Field of Search ................................. 395/882–884, 395/892–894, 887, 309, 311, 750.06; 341/20, 22; 364/709.12, 189, 708.1; 340/365 R, 365 P

[56] References Cited

U.S. PATENT DOCUMENTS

| | | | |
|---|---|---|---|
| 4,254,407 | 3/1981 | Tipon ...................................... | 395/884 |
| 4,644,497 | 2/1987 | Tajima et al. ........................... | 395/887 |
| 4,706,068 | 11/1987 | Eberhard ................................. | 340/365 |
| 5,323,153 | 6/1994 | Sonobe et al. ........................... | 341/20 |
| 5,440,502 | 8/1995 | Register ................................. | 364/708.1 |
| 5,757,354 | 5/1998 | Kawamura ............................... | 345/126 |
| 5,758,193 | 5/1998 | Tsuji et al. ............................. | 395/884 |

FOREIGN PATENT DOCUMENTS 2-304611  12/1990  Japan .

*Primary Examiner*—Ayaz R. Sheikh
*Assistant Examiner*—Raymond N Phan
*Attorney, Agent, or Firm*—Brinks Hofer Gilson & Lione

[57] ABSTRACT

A signal processing system which can perform cable transmission or optical transmission of data at the time of data transmission between a keyboard (1) and a signal processing unit to thereby has flexibility of data transmission. This signal processing system is composed of the keyboard (1), the signal processing unit and a receiving adapter unit. Further, the keyboard (1) consists of: a key matrix (6); a control portion (6) for outputting switch data corresponding to an operated key; a data transmitting portion (9) for outputting switch data through a cable (4); an optical data transmitting portion (10) for performing optical transmission of switch data; and a power supply (11). The receiving adapter unit is provided with: a data receiving portion for receiving switch data transmitted through the cable (4); an optical data receiving portion for receiving optical data transmitted by performing optical transmission; a storage portion for storing switch data received by a data receiving portion or an optical data receiving portion; and a transmission/reception control portion for converting switch data read from the storage portion into a switch code, for transmitting the switch code to the signal processing unit and for processing a signal supplied from the signal processing unit.

6 Claims, 5 Drawing Sheets

SIGNAL PROCESSING SYSTEM FOR TRANSMISSION OF DATA BETWEEN A KEYBOARD AND A SIGNAL PROCESSING UNIT

BACKGROUND OF THE INVENTION

1. Field of the Invention

The present invention generally relates to a signal processing system, and, more particularly, to a signal processing system, in which a receiving adapter unit is interposed between a keyboard and a signal processing unit, and in which switch data obtained by the keyboard is transmitted to the receiving adapter unit through a cable or as a light signal.

2. Description of the Related Art

Generally, in the case of connecting a keyboard to a signal processing unit such as a personal computer (PC), the signal processing unit and the keyboard are connected with a cable. When one of many keys provided on the keyboard is operated, a switch code (namely, a keyboard code) corresponding to the operated key is formed in the keyboard. This switch code is transmitted to the signal processing unit through the cable.

Figure 5:
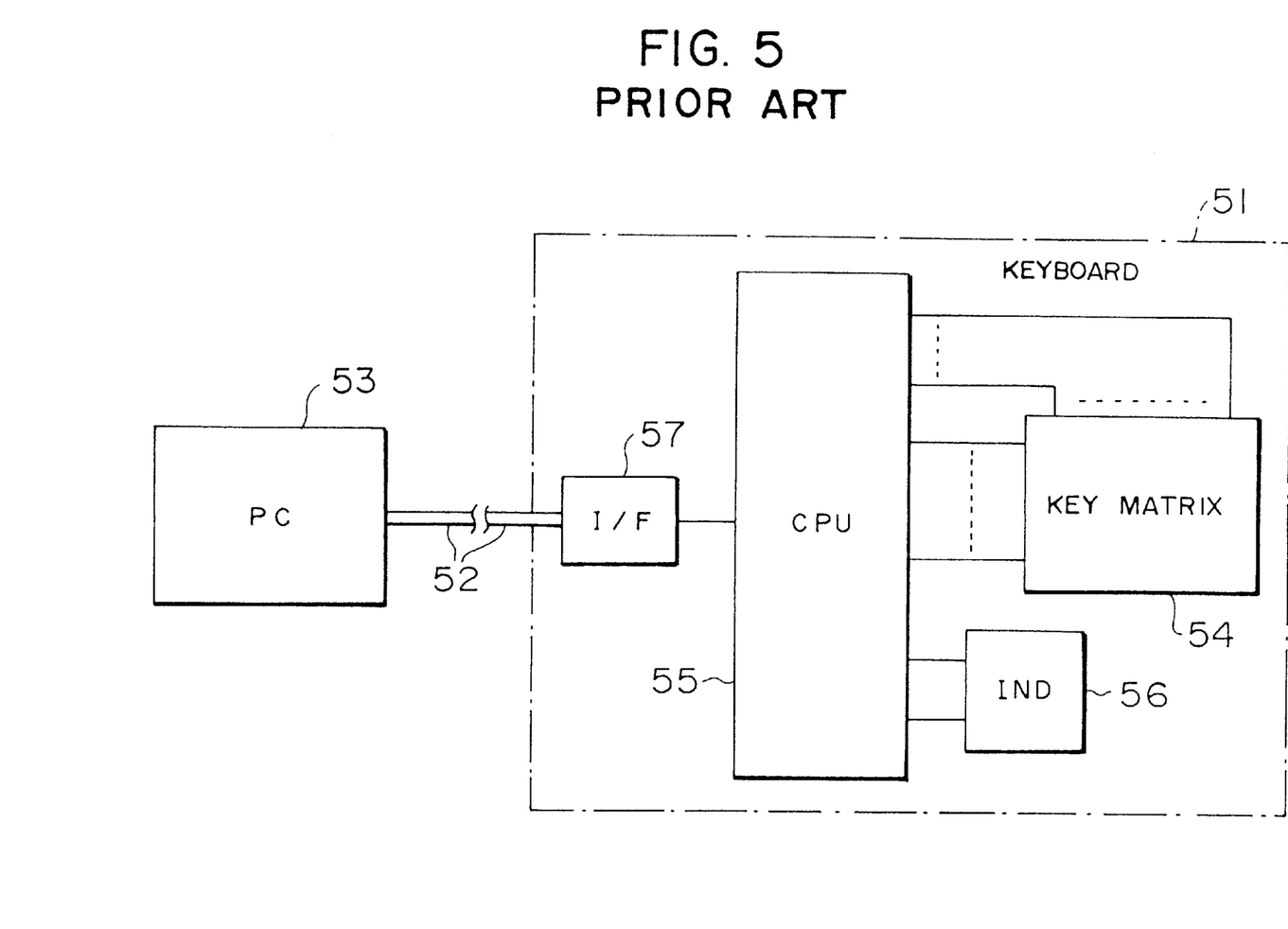
FIG. 5 is a block diagram illustrating the configuration of an example of the known signal processing system in which the keyboard is connected to the signal processing unit through the cable.

Referring now to FIG. 5, there is shown a block diagram illustrating the configuration of an example of a known signal processing system in which a keyboard is connected to a signal processing unit through a cable.

As illustrated in FIG. 5, the signal processing system is configured by connecting a keyboard 51 to a signa processing unit (PC) 53 through a cable 52. In this case, the keyboard 51 consists of: a key matrix 54 in which many keys are placed; a control portion (namely, a control processing unit (CPU)) 55 for supervising and controlling an operation of the entire keyboard by controlling (or managing)control data supplied from the signal processing unit 53; an indicating portion (IND) 56 for displaying operating conditions of the keys and so forth; and an interface circuit (I/F) 57 for interfacing between the keyboard 51 and the signal processing unit 53. In this case, the control portion 55 carries out the following various functions. Namely, a first one of the functions is to generate a scanning signal for sequentially scanning many keys provided on the key matrix 54. Further, a second one of the functions is to receive switch data corresponding to operated one of many keys that are scanned. Moreover, a third one of the functions is to convert accepted switch data into a switch code to be sent to the signal processing unit 53. Furthermore, a fourth one of the functions is to transmit the switch code to the signal processing unit 53 through the interface circuit 57 and the cable 52. Additionally, a fifth one of the functions is to transmit predetermined indication data to the indicating portion 56. Besides, a sixth one of the functions is to perform predetermined signal processing in response to a command signal supplied to the control portion 55 from the signal processing unit 53 through the cable 52.

When some (namely, one or more) of the many keys placed on the key matrix 54 are operated in the signal processing system having the aforementioned configuration, the control portion 55 receives switch data, which respectively correspond to the operated keys, in sequence. Subsequently, the control portion 55 converts the received switch data into switch codes to be sent to the signal processing unit 53. Then, the control portion 55 transmits the switch codes to the signal processing unit 53 sequentially through the interface circuit 57 and the cable 52. If some command data is supplied to the control portion 55 from the signal processing unit 53 during transmitting these switch codes, the control portion 55 performs an operation, which corresponds to the contents of a command represented by the command data, in response to the command data.

Further, among known signal processing systems, there has been developed what is called a wireless keyboard, which is wirelessly connected with a signal processing unit by transmitting light signals such as an infrared light signal therefrom so that the light signal is received by the signal processing unit, instead of connecting a signal processing unit therewith through a cable. An example of such a system is disclosed in the Japanese Unexamined Patent Publication No. 2-304611.

Meanwhile, the known signal processing system, in which a keyboard and a signal processing unit are connected with each other through a cable, has problems in that kinds or types of keyboards, which can be connected to the signal processing unit, are limited, that in addition, kinds of data, which can be transmitted between the keyboard and the signal processing unit, is limited to switch data and so on, which can be processed in the signal processing unit and that thus, the data transmission performed in the signal processing system lacks flexibility.

On the other hand, the known signal processing system, in which a keyboard and a signal processing unit are wirelessly connected with each other by transmitting a light signal, has similar problems in that the kind of a keyboard, which can transmit data to and received data from the signal processing unit, is limited to a wireless keyboard, that in addition, kinds of data, which can be optically transmitted between the keyboard and the signal processing unit, is limited to switch data and so forth, which can be processed in the signal processing unit and that thus, the data transmission performed in the signal processing system lacks flexibility.

The present invention is accomplished to solve these problems of the known signal processing systems.

SUMMARY OF THE INVENTION

Accordingly, an object of the present invention is to provide a signal processing system that has flexibility of data transmission by enabling cable transmission or optical transmission when performing data transmission between a keyboard and a signal processing unit thereof.

To achieve the foregoing object, in accordance with the present invention, there is provided a signal processing system, which comprises: a receiving adapter unit interposed between a keyboard and a signal processing unit; and means, by which data transmission between the keyboard and the receiving adapter unit is performed by carrying out cable transmission or optical transmission using switch data independent of a data format and by which data transmission between the receiving adapter unit and the signal processing unit is performed by carrying out cable transmission using a switch code that can be processed in the signal processing unit.

As a result of employing such means, data transmission from the keyboard to the receiving adapter unit can be achieved by carrying out cable transmission of data presented in the form of an electric signal or wireless transmission of data presented in the form of an optical signal. Moreover, a plurality of kinds of keyboards can be connected to the receiving adapter unit by suitably changing the configuration of the receiving adapter unit. Consequently, a signal processing system having flexibility of data transmission is obtained.

In the case of an embodiment of (namely, a mode for carrying out) the present invention, a signal processing system according to the present invention comprises: a keyboard; a signal processing unit; and a receiving adapter unit. Further, the keyboard and the receiving adapter unit are selectively connected with each other through a first cable. Moreover, the receiving adapter unit and the signal processing unit are selectively connected to each other through a second cable. Furthermore, the keyboard comprises: a key operating portion having a large number of keys; a control portion for outputting switch data corresponding to an operated one of said large number of keys; a data transmitting portion for outputting the switch data through the first cable; an optical data transmitting portion for performing optical transmission of the switch data; and a built-in power supply. Additionally, the receiving adapter unit comprises: a data receiving portion for receiving the switch data transmitted through the first cable; an optical data receiving portion for receiving optical data transmitted by performing optical transmission; a storage portion for storing the switch data received by the data receiving portion or by the optical data receiving portion; and a transmission/reception control portion for converting the switch data, which is read from the storage portion, into a switch code (namely, a keyboard code), for transmitting the switch code to the signal processing unit and for processing a signal supplied from the signal processing unit.

Besides, in the case of another embodiment of (namely, another mode for carrying out) the present invention, in the signal processing system according to the present invention, the keyboard is provided with a coordinate input operation element (or device). Further, the control portion has the functions of outputting coordinate data obtained when operating the coordinate input operation element, and of supplying the coordinate data to the optical data transmitting portion.

Thus, in accordance with the embodiment (namely, the signal processing system) of the present invention, when operating some of the keys placed on the keyboard, switch data obtained by operating the keys is transmitted to the receiving adapter unit through the first cable, or is converted into optical data which is further transmitted from the keyboard to the receiving adapter unit. Thereby, when performing transmission of switch data between the keyboard and the receiving adapter, the system can suitably select one of the transmission of switch data itself and the wireless transmission of optical data obtained by converting the switch data. Consequently, the present invention has an advantage (or effect) in that a signal processing system, which has flexibility of data transmission, can be configured (or obtained).

Further, in accordance with the embodiment (namely, the signal processing system) of the present invention, if the configuration of the receiving adapter unit is suitably altered when changing the kind of the keyboard (namely, if the receiving adapter unit having the configuration suited for the kind of the keyboard is selected), a plurality of kinds of keyboards can be connected to the receiving adapter unit. Thus, similarly, the present invention has an advantage (or effect) in that another signal processing system, which has flexibility of data transmission, can be configured (or obtained).

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF THE PREFERRED EMBODIMENT

Hereinafter, the preferred embodiment of the present invention will be described in detail by referring to the accompanying drawings.

Figure 1:
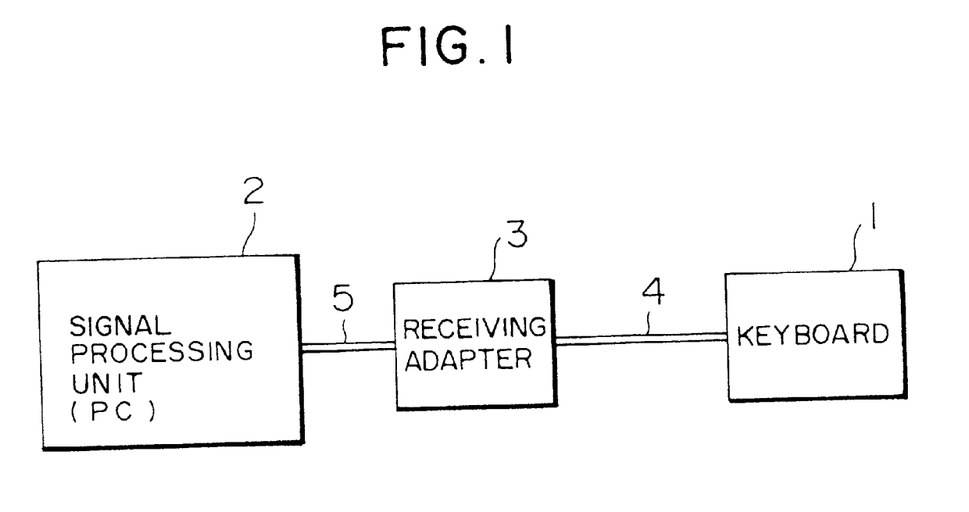
FIG. 1 is a block diagram schematically illustrating the configuration of a signal processing system of the present invention.

FIG. 1 is a block diagram schematically illustrating the configuration of a signal processing system according to the present invention.

As illustrated in FIG. 1, the signal processing system is composed of: a keyboard 1; a signal processing unit 2 constituted by a personal computer; a receiving adapter unit 3; a first cable 4 for selectively connecting the keyboard 1 with the receiving adapter unit 3; and a second cable 5 for connecting the signal processing unit 2 with the receiving adapter unit 3. Thus, the keyboard 1 and the signal processing unit 2 are connected with each other through the receiving adapter unit 3.

Figure 2:
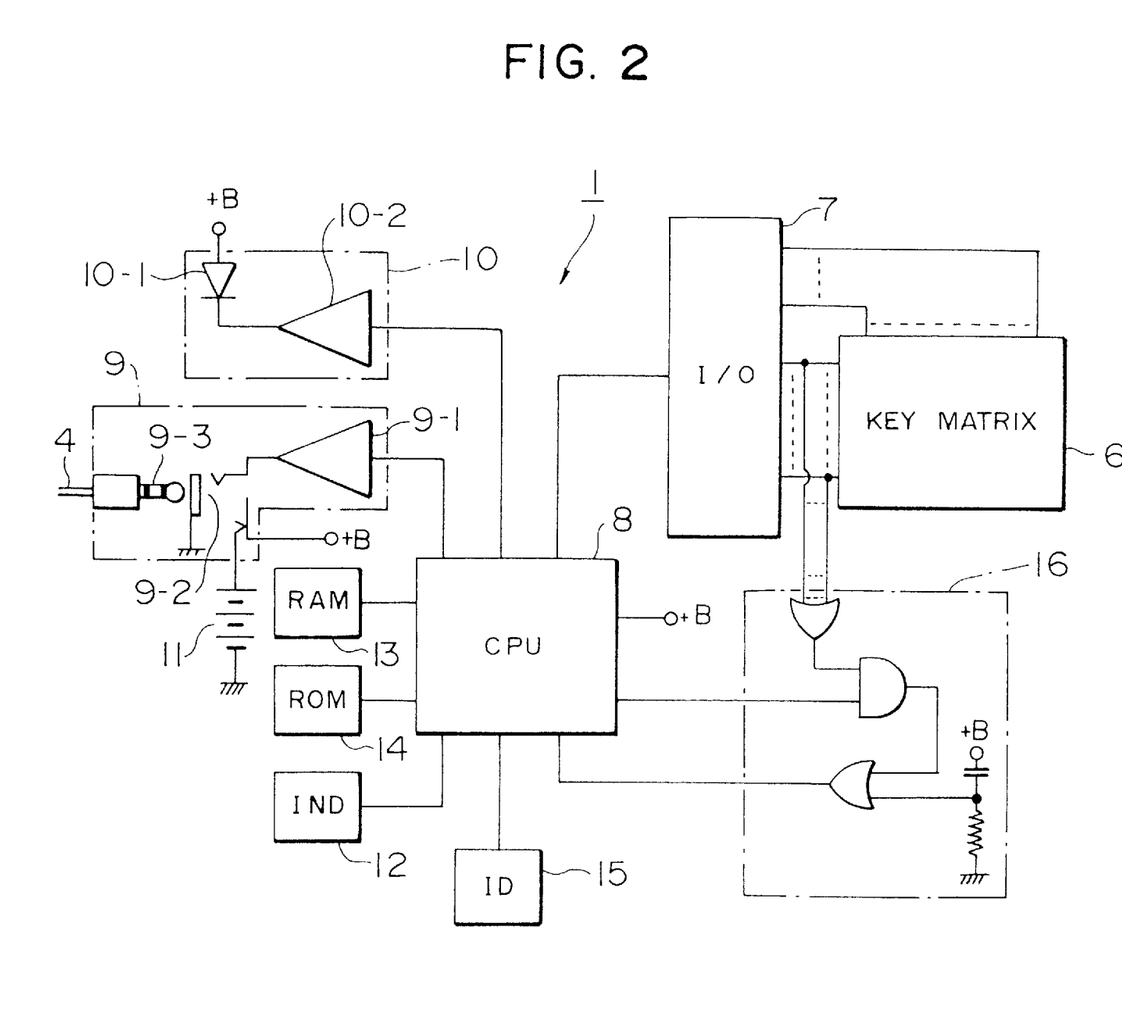
FIG. 2 is a block diagram schematically illustrating the configuration of a practical example of a keyboard used in the signal processing system illustrated in FIG. 1.
Figure 3:
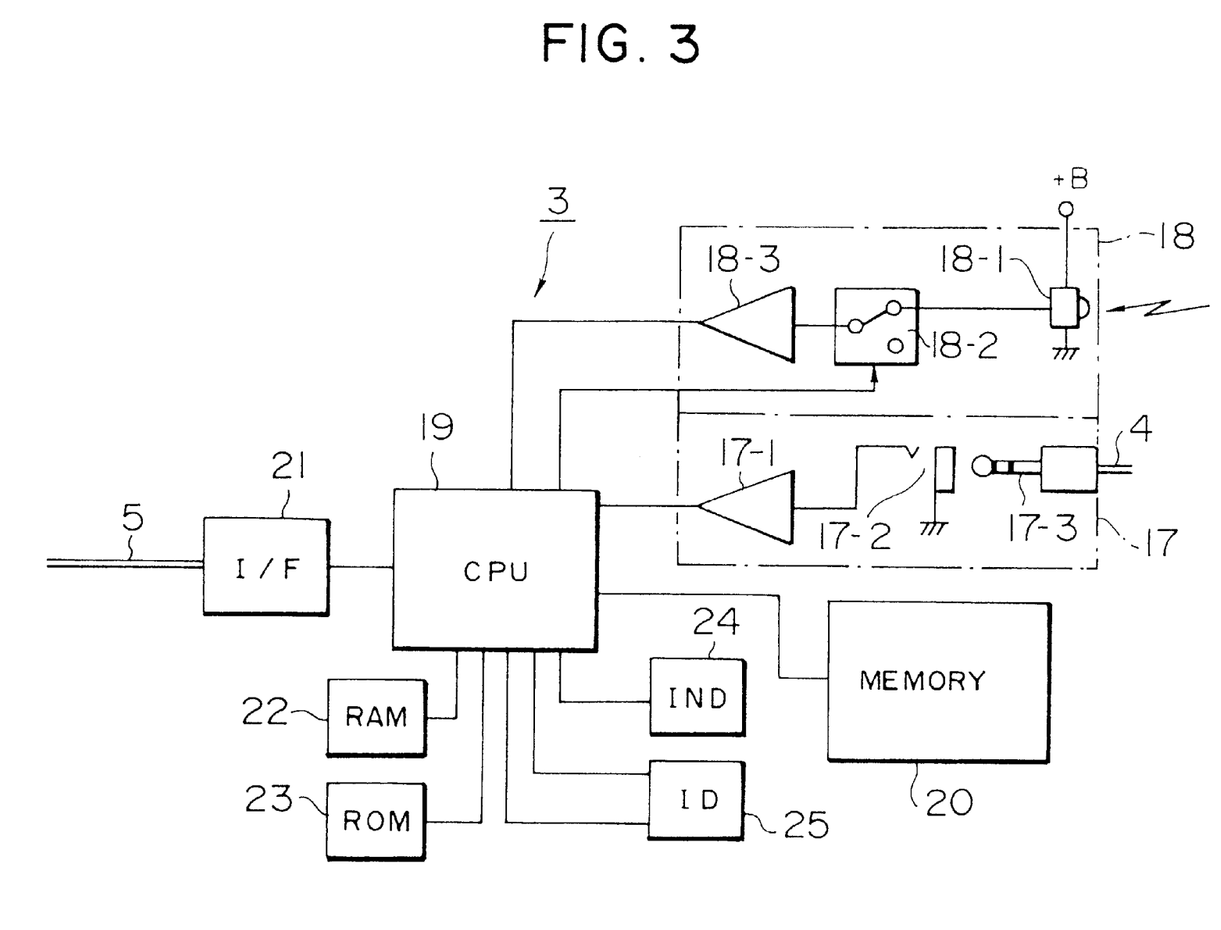
FIG. 3 is a block diagram schematically illustrating the configuration of a practical example of a receiving adapter unit used in the signal processing system illustrated in FIG. 1.

Referring next to FIG. 2, there is shown a block diagram which illustrates the configuration of a practical example of the keyboard used in the signal processing system illustrated in FIG. 1. FIG. 3 is a block diagram which illustrates the configuration of a practical example of the receiving adapter unit used in the signal processing system illustrated in FIG. 1.

As illustrated in FIG. 2, the keyboard 1 is provided with: a key matrix (namely, a key operation portion (or a keying portion)) 6; an input/output circuit (I/O) 7; a control portion (CPU) 8; a data transmitting portion 9 which includes a buffer 9-1, a jack 9-2 and a plug 9-3; an optical data transmitting portion 10 which includes a light emitting diode 10-1 and a buffer 10-2; a built-in power supply 11; an indicating portion(IND) 12; a random access memory (RAM) 13; a read-only memory (ROM) 14; an ID circuit (namely, a first ID setting portion) 15; and an enable/reset circuit 16.

Further, the key matrix 6, in which a large number of keys are provided, is scanned in the lateral or transverse direction (namely, in the direction of X-axis) by using a scan (or scanning) signal supplied from the input/output circuit 7. The data transmitting signal 9 has the buffer 9-1, whose input and output terminals are respectively connected to the control portion 8 and the jack 9-2, and further has the plug 9-3 which is connected to the first cable 4. In the optical data transmitting portion 10, the light emitting diode 10-1 is connected to a power supply terminal (+B) and an output terminal of the buffer 10-2. Further, an input terminal of the buffer 10-2 is connected to the control portion 8. The built-in power supply 11 is operative to supply operating power (+B) to each of composing parts of the keyboard 1, and has an output terminal connected to the jack 9-2. The indicating (or displaying) portion 12 is provided with one or more indicators, each of which is constituted by a light emitting diode or the like, and is connected to the control portion 8. Furthermore, the RAM 13 and the ROM 14 are also connected to the control portion 8. Further, the ID circuit 15 is operative to select ID unique to the keyboard 1 and is connected to the control portion 8. The enable/reset circuit 16 is composed of a plurality of logic circuits (not numbered) and is connected to the control portion 8 and the key matrix 6.

Moreover, as illustrated in FIG. 3, the receiving adapter unit 3 is provided with: a data receiving portion 17 which includes a buffer 17-1, jack 17-2 and a plug 17-3; an optical data receiving portion 18 which includes light receiving device (or element) 18-1, a changeover switch 18-2 and a buffer 18-3; a control portion (CPU) 19; a memory (namely, a storage portion) 20; an interface circuit 21; a RAM 22; a ROM 23; an indicating portion (IND) 24; and an ID circuit (namely, a second ID setting portion) 25.

Further, in the data receiving portion 17, an input terminal and an output terminal of the buffer 17-1 are connected to the jack 17-2 and the control portion 19, respectively. Furthermore, the plug 17-3 is connected to the first cable 4. In the optical data receiving portion 18, the light receiving element 18-1 is connected to the power supply terminal (+B) and one of fixed contacts of the changeover switch 18-2. Moreover, an input terminal and an output terminal of the buffer 18-3 are connected to a moving contact of the changeover switch 18-2. Furthermore, an output terminal of the buffer 18-3 is connected to the control portion 19. Additionally, the memory 20 is a RAM serving as a virtual key matrix, and is connected to the control portion 19. Further, the RAM 22 and the ROM 23 are connected to the control portion 19. The indicating portion 24 is provided with one indicators, each of which is constituted by a light emitting diode or the like, and is connected to the control portion 19. Furthermore, the ID circuit 25 is operative to select ID unique to the receiving adapter unit 3 and is connected to the control portion 19.

The signal processing system having the aforementioned configuration operates as follows.

In the case that the plug 9-3 is not inserted into the jack 9-2 in the keyboard 1 and that the plug 17-3 is not inserted into the jack 17-2 in the receiving adapter unit 3, namely, in the case that the cable connection between the keyboard 1 and the receiving adapter unit 3 is not established (hereunder, this case will be referred to as a cable non-connection case), an output of the built-in power supply 11 is supplied to the power supply terminal (B+) of the keyboard 1, so that the keyboard 1 is in an operable (or operatable) condition (or state).

When some of the many keys placed in the key matrix 6 which is in this condition, data representing the kinds and the operating conditions of the operated (one or more) keys is supplied to the control portion 8 through the input/output circuit 7. The control portion 8 responds to the supplied data and converts the supplied data into switch data that represents the kinds of the operated keys and the operating condition (namely, the discrimination between a continuous key operation and an instantaneous key operation) thereof. Further, the control portion 8 applies the converted switch data to the data transmitting portion 9 and the optical data transmitting portion 10. Then, in the data transmitting portion 9, the applied switch data is amplified by the buffer 9-1. Thereafter, the amplified switch data is supplied to the jack 9-2. The switch data, however, is not transmitted to the receiving adapter unit 3 through the first cable 4, because the plug 9-3 is not inserted into the jack 9-2. On the other hand, in the optical data transmitting portion 10, the supplied switch data is amplified in the buffer 10-2. Then, the amplified switch data is supplied to the light emitting diode 10-1 to thereby drive and cause the light emitting diode 10-1 to emit light. Subsequently, optical data including the switch data is transmitted to the receiving adapter unit 3. When performing such an operation, the control portion 8 performs the operation in compliance with a program stored in the ROM 14 by using the RAM 13. Further, the condition or state of the operation is appropriately displayed in the indicating portion 12.

On the other hand, in the receiving adapter unit 3, the optical data transmitted from the keyboard 1 is received in the light receiving element 18-1 of the optical data receiving portion 18, so that the switch data is outputted from the light receiving element 18-1. Then, this switch data passes through the changeover switch 18-2, which has been changed and placed in a position corresponding to the light receiving element 18-1, and is subsequently amplified in the buffer 18-3. Thereafter, the amplified switch data is supplied to the control portion 19. Then, the control portion 19 transmits and supplies the supplied switch data to the memory 20 in which the key operation condition represented by the switch data is temporarily stored at an address (or location) corresponding to the kind of each of the operated keys, which is also represented by the switch data. In this case, the addresses in the memory 20, which respectively correspond to the switch data, are identified or located in a manner as (the addresses in the memory 20 would be identified) if the memory 20 constituted a virtual key matrix. Subsequently, the control portion 19 reads the switch data, which has temporarily been stored in the memory 20, and further converts the read switch data into a switch code (namely, a keyboard code), which can be processed by the signal processing unit 2. The switch code obtained by the conversion is transmitted to the signal processing unit 2 through the second cable 5 after the interface circuit 21 interfaces with the signal processing unit 2. Even when performing such an operation, the control portion 19 performs the operation in compliance with a program stored in the RAM 23 by using the RAM 22. Further, the condition or state of the operation is appropriately displayed in the indicating portion 24.

Next, in the case that the plug 9-3 is inserted into the jack 9-2 of the data transmitting portion 9 in the keyboard 1 and that the plug 17-3 is inserted into the jack 17-2 of the data receiving portion 17 in the receiving adapter unit 3, namely, in the case that the cable connection between the keyboard 1 and the receiving adapter unit 3 is established (hereunder, this case will be referred to as a cable connection case), an output of the built-in power supply 11 is disconnected from the power supply terminal (+B) of the keyboard 1 but the operating power of the keyboard 1 is supplied to the power supply terminal (+B) through the cable 4. Consequently, the keyboard 1 is similarly put into a operable condition (or state).

When some of the many keys placed in the key matrix 6 are operated during the keyboard 1 is in such a condition, an operation of the control portion 8 is almost the same as that of the control portion 8 in the cable non-connection case. However, in the cable connection case, when the switch data is applied to the data transmitting portion 9, the applied switch data is amplified in the buffer 9-1. Thereafter, the switch data passes through the plug 9-3 inserted into the jack 9-2 and is transmitted to the receiving adapter unit through the first cable 4. The operation of the control portion 8 in the cable connection case is different in these respects from that thereof in the cable non-connection case.

On the other hand, when switch data is supplied to the data receiving portion 17 in the receiving adapter unit 3 through the first cable 4 from the keyboard 1, the supplied switch data is amplified in the buffer 17-1 after passing through the plug 17-1 inserted in the jack 17-2. At that time, optical data transmitted from the keyboard 1 is received in the light receiving element 18-1. Then, switch data is outputted from the light receiving element 18-1. However, when switch data is supplied to the data receiving portion 17, the control portion 19 changes the position of the moving contact of the changeover switch 18-2 to thereby stop the supply of switch data, which is outputted from the light receiving element 18-1, to the buffer 17-1. Thus, the control portion 19 transmits and supplies the switch data, which is supplied from the data receiving portion 17, to the memory 20. The subsequent operation of the control portion 19 is nearly the same as that thereof in the aforementioned cable non-connection case.

Incidentally, the second cable 5 for connecting the signal processing unit 2 with the receiving adapter unit 3 is used not only for transmission of a switch code (namely, a keyboard code) to be supplied from the receiving adapter unit 3 to the signal processing unit 2, but also for transmission of various data to be supplied from the signal processing unit 2 to the receiving adapter unit 3. In addition, the second cable 5 is used to transmit the driving power for operating the receiving adapter unit 3 and the driving power for operating the keyboard 1 from the signal processing unit 2 to the receiving adapter unit 3 simultaneously.

Further, in the case of transmitting switch data from the keyboard 1 to the receiving adapter unit 3, a first ID selected by the first ID circuit 15 of the keyboard 1 may be transmitted simultaneously with the transmission of the switch data. Moreover, in the case of transmitting the switch code (namely, the keyboard code) from the receiving adapter unit 3 to the signal processing unit 2, the first ID selected by the keyboard 1 and/or the second ID selected by the ID circuit 25 of the receiving adapter unit 3 may be transmitted simultaneously with the transmission of the switch code.

Thus, in accordance with this embodiment of the present invention, the receiving adapter unit 3 is interposed between the keyboard 1 and the signal processing unit 2. Further, when transmitting the switch data between the keyboard 1 and the receiving adapter unit 3, only optical transmission is performed in the case that the first cable 4 is not connected therebetween. In contrast, the data transmission through the first cable 4 is performed concurrently and simultaneously with the optical data transmission in the case that the first cable 4 is connected therebetween in such a manner that so that only the transmission through the first cable 4 is effective. Consequently, a signal processing system, which has flexibility of data transmission, can be obtained.

Furthermore, in accordance with the present invention, if the configuration of the receiving adapter unit 3 is suitably changed (namely, if the receiving adapter unit having the configuration suited for the kind of the keyboard is selected) in the case of altering the kind of the keyboard 1, a plurality of kinds of the keyboards 1 can be connected to the receiving adapter unit 3. From this point of view, it can be said that a signal processing system, which has flexibility of data transmission, is obtained.

Figure 4:
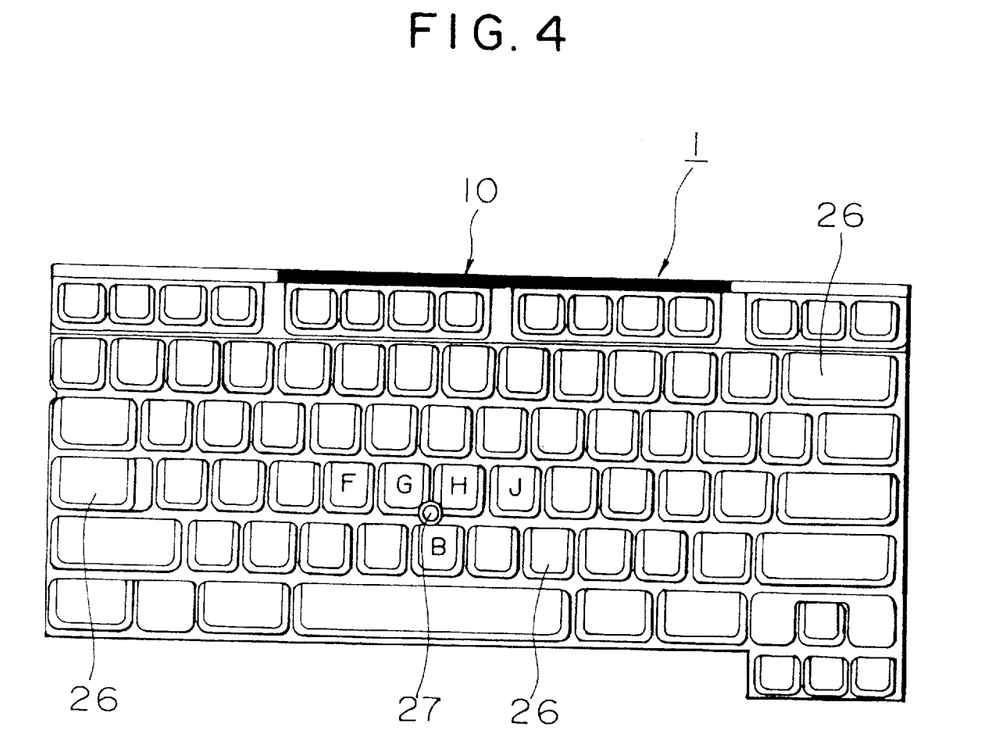
FIG. 4 is a block diagram schematically illustrating the configuration of another practical example of a keyboard used in the signal processing system illustrated in FIG. 1.

Referring next to FIG. 4, there is shown a top view of another practical example of the keyboard used in the signal processing system illustrated in FIG. 1.

As shown in FIG. 4, in the case of this example of the keyboard 1, a pointer 27, which is a kind of a coordinate inputting element or device, is placed in the keyboard 1 in addition to the many keys 26. Moreover, the optical data transmitting portion 10 is provided in a rear side portion of the keyboard 1.

Further, the pointer 27 is placed among predetermined ones of the keys. In the case of the example illustrated in FIG. 4, alphabetic keys respectively corresponding to letters "G", "H" and "B". Moreover, at least two light emitting diodes 10-1 are provided in the optical data transmitting portion 10.

When the pointer 27 is operated in the keyboard 1, an output value corresponding to the condition of this operation is applied to the control portion 8. Further, when such an output value is applied, the control portion 8 converts the output value into X-coordinate data (namely, abscissa data) and Y-coordinate data (namely, ordinate data) which are applied or supplied to the optical data transmitting portion 10, similarly as in the case of the switch data. In the optical data transmitting portion 10, the supplied coordinate data are amplified in the buffer 10-2. Then, the amplified data are supplied to the light emitting diodes 10-1. Subsequently, the supplied coordinate data are transmitted from the light emitting diodes 10-1 to the receiving adapter unit 3 as optical data.

On the other hand, when optical data is received by the light receiving element 18-1 of the optical data transmitting portion 18 in the receiving adapter unit 3, the coordinate data are outputted from the light receiving element 18-1. This coordinate data is supplied to the control portion 19 through the changeover switch 18-2 and the buffer 18-3. In this case, the control portion 19 converts the coordinate data into coordinate codes, which can be processed by the signal processing unit 2, without supplying and transmitting the coordinate data to the memory 20. The coordinate codes obtained by the conversion are transmitted to the signal processing unit 2 through the interface circuit 21 and the second cable 5.

Although the preferred embodiment of the present invention has been described above, it should be understood that the present invention is not limited thereto and that other modifications will be apparent to those skilled in the art without departing from the spirit of the invention.

For example, in the foregoing description of this embodiment of the present invention, an example, in which the pointer 27 is used as the coordinate inputting element, has been described. However, the coordinate inputting element is not limited to the pointer 27. Another coordinate inputting element or device, for instance, a track (or tracker) ball may be used.

The scope of the present invention, therefore, should be determined solely by the appended claims.

What is claimed is:

1. A signal processing system comprising:
   a keyboard,
   a signal processing unit, said signal processing unit including an operating electrical power supply; and
   a receiving adapter unit,
   wherein said keyboard and said receiving adapter unit are selectively connected with each other by performing cable connection by use of a cable, wherein said signal processing unit is connected to said receiving adapter unit, wherein said keyboard comprises:
- a key operating portion having a large number of keys;
- a control portion for outputting switch data corresponding to an operated one of said large number of keys;
- a data transmitting portion for outputting the switch data through said cable; an optical data transmitting portion for performing optical transmission of the switch data; and
- a built-in power supply, wherein when the keyboard and the receiving adapter unit are not connected with each other by said cable, said built-in power supply becomes a power supply for said keyboard and when said keyboard and said receiving adapter device are connected with each other by said cable, an output from said built-in power supply is shut off and said operating electrical power supply from said signal processing unit becomes a power supply for the keyboard through said cable; and wherein said receiving adapter unit comprises:
- a data receiving portion for receiving the switch data transmitted through said cable;
- an optical data receiving portion for receiving optical data transmitted by performing optical transmission;
- a storage portion for storing the switch data received by said data receiving portion or by said optical data receiving portion; and
- a transmission/reception control portion for converting the switch data, which is read from said storage portion, into a switch code, for transmitting the switch code to said signal processing unit and for processing a signal supplied from said signal processing unit.

2. The signal processing system according to claim 1, wherein said keyboard is provided with a coordinate input operation element, and wherein coordinate data obtained by operating said coordinate input operation element is supplied to said optical data transmitting portion.

3. The signal processing system according to claim 1, wherein said keyboard is provided with a first ID setting portion that is able to set a first ID, and wherein said adapter unit is provided with a second ID setting portion that is able to set a second ID.

4. The signal processing system according to claim 1, wherein each of said keyboard and said receiving adapter unit has a jack portion, and wherein the cable connection between said keyboard and said receiving adapter unit is established through said jack portions.

5. The signal processing system according to claim 1, wherein said receiving adapter unit is selectively built into a front face portion of a panel of said signal processing unit.

6. The signal processing system according to claim 1, wherein said optical data receiving portion comprises switch means for turning on/off optical transmitted data from the keyboard, and said optical data receiving portion performs only a transmission of optical transmission data from the keyboard when said cable is not connected, performs both a full data transmission and the optical data transmission concurrent to each other when said cable is connected and makes only the data transmission through cable effective by said switch means.

* * * * *